United States Patent
Li et al.

(10) Patent No.: US 9,946,380 B2
(45) Date of Patent: Apr. 17, 2018

(54) FAULT DETECTION CIRCUIT OF IN CELL TYPE TOUCH DISPLAY PANEL BEFORE CELL PROCESS AND FAULT DETECTION METHOD

(71) Applicant: Shenzhen China Star Optoelectronics Technology Co., Ltd., Shenzhen (CN)

(72) Inventors: Wenying Li, Shenzhen (CN); Sikun Hao, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 280 days.

(21) Appl. No.: 14/787,765

(22) PCT Filed: Oct. 10, 2015

(86) PCT No.: PCT/CN2015/091637
§ 371 (c)(1),
(2) Date: Oct. 29, 2015

(65) Prior Publication Data
US 2017/0160844 A1    Jun. 8, 2017

(30) Foreign Application Priority Data
Aug. 18, 2015    (CN) .......................... 2015 1 0508996

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1368* (2013.01); *G02F 1/13338* (2013.01); *G02F 1/134309* (2013.01)

(58) Field of Classification Search
CPC ...................................................... G06F 3/044
See application file for complete search history.

(56) References Cited

U.S. PATENT DOCUMENTS

| 2007/0146002 A1* | 6/2007 | Hsieh | ..................... G09G 3/006 324/760.02 |
| 2009/0025987 A1* | 1/2009 | Perski | ..................... G06F 3/041 178/18.03 |

(Continued)

FOREIGN PATENT DOCUMENTS

| CN | 101017419 A | 8/2007 |
| CN | 103279248 A | 9/2013 |
| CN | 104321967 A | 1/2015 |

*Primary Examiner* — Sanghyuk Park
(74) *Attorney, Agent, or Firm* — Leong C. Lei (57) ABSTRACT

The present invention provides a detection circuit of an In Cell type touch display panel and a detection method. By locating a line multiplexer corresponding to the touch sensing electrodes of each column, and selecting and charging at least one parasitic capacitor constructed with the touch sensing electrode and a ground in the touch sensing electrodes of the column with the line multiplexer, and then, measuring the charge electric quantity with the electric quantity measurement unit, and judging whether the touch sensing electrode faults or not according to the value of the charged electric quantity, the detection circuit can accomplish the fault detection to the touch sensing electrode in the array process.

10 Claims, 8 Drawing Sheets

(51) Int. Cl.
*G02F 1/1343* (2006.01)
*G02F 1/1368* (2006.01)

(56) References Cited

U.S. PATENT DOCUMENTS

2014/0125880 A1* 5/2014 Tsai .................... G02F 1/13338
349/12
2014/0375600 A1* 12/2014 Pan ....................... G06F 3/0418
345/174

* cited by examiner

FAULT DETECTION CIRCUIT OF IN CELL TYPE TOUCH DISPLAY PANEL BEFORE CELL PROCESS AND FAULT DETECTION METHOD

FIELD OF THE INVENTION

The present invention relates to a display technology field, and more particularly to a detection circuit of an In Cell type touch display panel and a detection method.

BACKGROUND OF THE INVENTION

With the rapid development of the display technology, the touch control display panel has been widely applied and accepted, used by the people. For example, the smart phone, the flat panel computer and etc. all use the touch control display panel. The touch control display panel is to combine the touch control panel and the liquid display panel as one to make the liquid crystal display panel equipped with functions of display and sensing the touch control inputs at the same time.

Generally, the liquid crystal panel mainly comprises a Color Filter (CF), a Thin Film Transistor Array Substrate (TFT Array Substrate) and a Liquid Crystal Layer positioned inbetween. The working principle is that the light of backlight module is reflected to generate images by applying driving voltages to the two glass substrate for controlling the rotations of the liquid crystal molecules. The formation process generally comprises: a forepart Array process, a middle Cell process and a post module assembly process. The forepart Array process is mainly to form a TFT substrate and a CF substrate; the middle Cell process is to laminate the TFT substrate and the CF substrate, and to inject liquid crystals between the two; the post module assembly process is to assemble the liquid crystal panel and the backlight module.

The touch control display panels can be categorized into four types of resistive, capacitive, optics, surface acoustic wave according to the sensing technology. At present, the main stream touch control technology is the capacitive type. According to the different structures of the touch display panels, the panels can be divided into: In Cell touch display panel and Out Cell touch display panel. The Out Cell touch display panel is to separately produce the touch panel and the liquid crystal display panel, and then to be laminated together to be a display panel having touch control function. The Out Cell has drawbacks of higher manufacture cost, lower light transmittance and thicker module. The In Cell touch display panel is to embed the touch panel function inside the liquid crystal panel to make the liquid crystal panel possess functions of display and touch input sense at the same time. In comparison with the Out Cell touch display panel, it has advantages of lower cost and thinner thickness, and has been favored by respective big display makers. Furthermore, according to the different positions of the touch circuit embedded in the liquid crystal panels, the In Cell touch display panels can be categorized into two types: one is that the touch control circuit is on the liquid crystal cell (On Cell), and the other is that the touch control circuit is inside the liquid crystal cell (In Cell). Compared with the Out Cell touch display panel, the In Cell touch display panel can make the panel lighter and thinner and has already been employed by a lot of mobile phone producers. It has been the main development direction of the future touch control technology.

Figure 1:
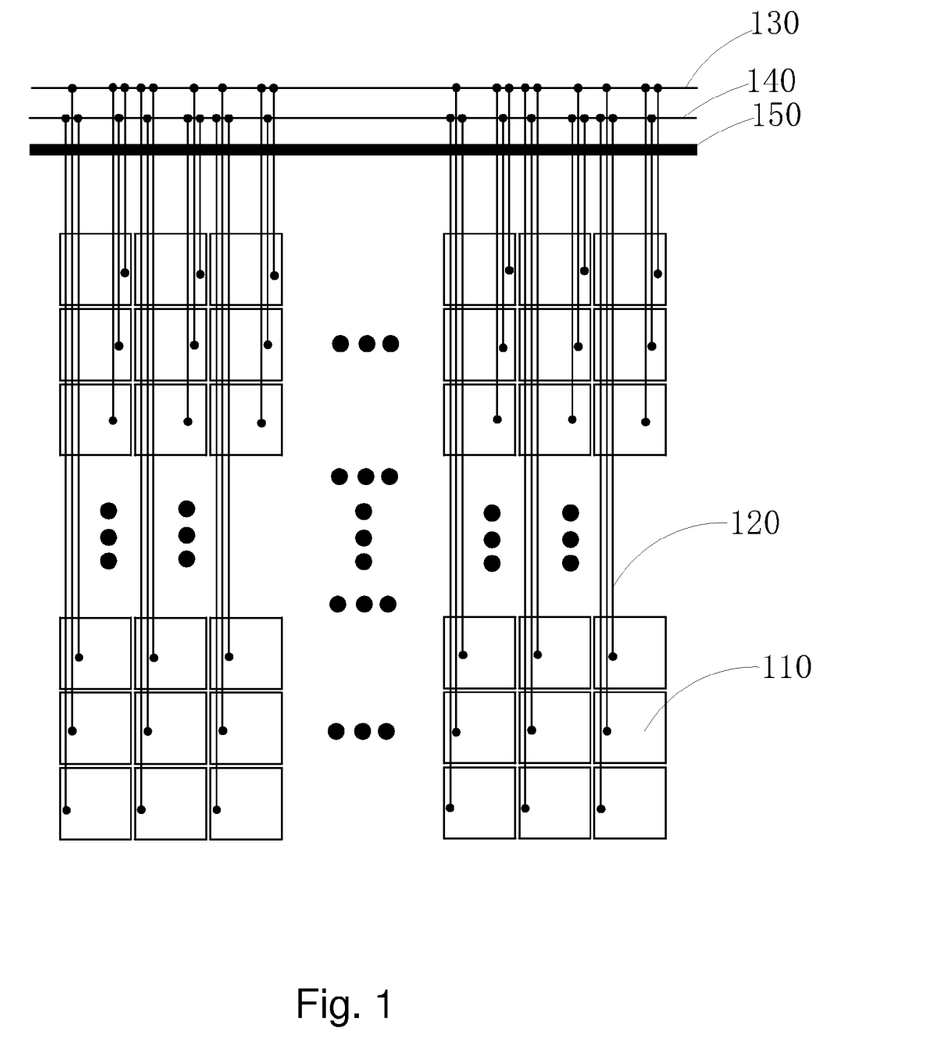
FIG. 1 is a circuit diagram of a detection circuit of an In Cell type touch display panel according to prior art.

For ensuring the normal work of the In Cell touch display panel, it is required to detect the embedded touch circuit. As shown in FIG. 1, which is a detection circuit of the In Cell touch display panel according to prior art, comprising a plurality of touch sensing electrodes 110 aligned in array and mutually insulated, and each touch sensing electrode 110 correspondingly coupled to one touch conductive line 120, and the touch conductive line 120 adjacent to the touch sensing electrode 110 is respectively coupled to the odd touch sensing electrode detection line 130 and even touch sensing electrode detection line 140 via detection switches 150. The touch sensing electrodes 110 are the common electrode (COM) of the liquid crystal display panel.

Figure 2:
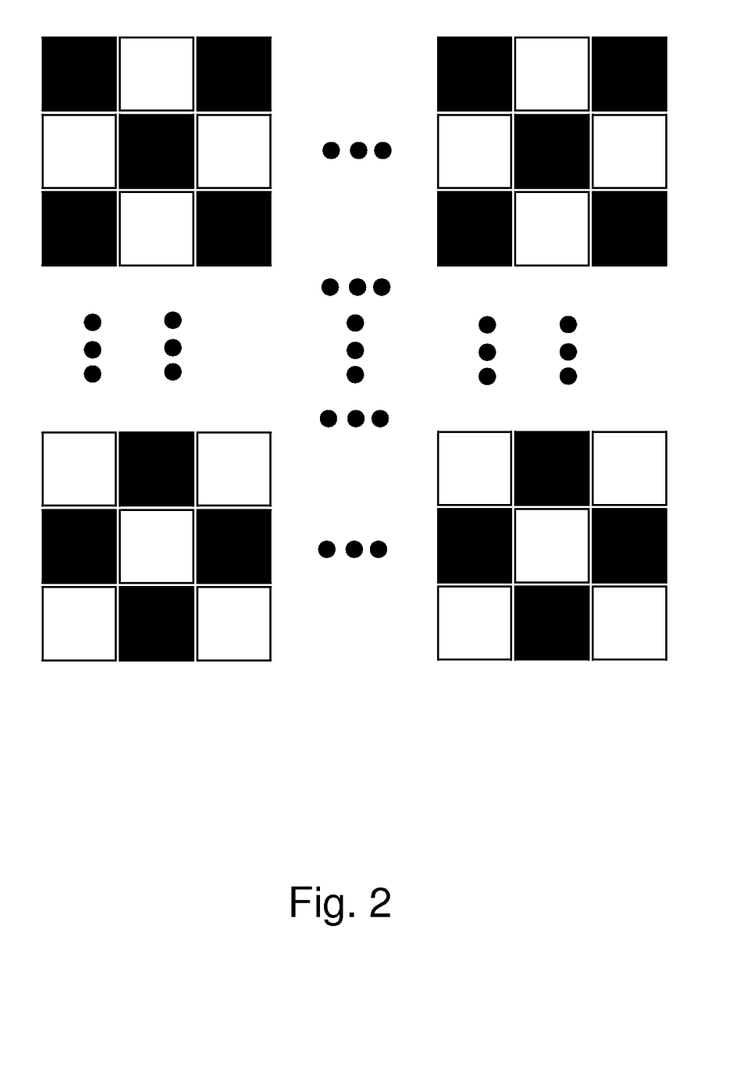
FIG. 2 is a detection image diagram when the In Cell type touch display panel according to prior art normally functions.

Specifically, as the In Cell touch display panel normally functions, the detection switch 150 is in off state, and all the touch sensing electrodes 110 are independent with one another. As conducting the function detection of the In Cell touch display panel, the detection switch 150 is in activation state. The low voltage corresponding to 0 gray scale is inputted to all the touch sensing electrodes 110 coupled to the odd touch sensing electrode detection line 130 via the odd touch sensing electrode detection line 130, and the high voltage corresponding to 255 gray scale is inputted to all the touch sensing electrodes 110 coupled to the even touch sensing electrode detection line 140 via the even touch sensing electrode detection line 140. Meanwhile, the high voltage corresponding to 255 gray scale is inputted to each pixel electrode (not shown) via the data signal line (not shown), and then watching the display condition of the panel. As shown in FIG. 2, if the voltage of the touch sensing electrode 11 is the white image of the low voltage corresponding to 0 gray scale, and the voltage of the touch sensing electrode 11 is the black image of the high voltage corresponding to 255 gray scale. Then, it shows that the touch function is normal; if the display image does not show according to the aforesaid rules, it shows that the function of the touch sensing electrode 110 is abnormal, and short circuit or disconnection might exist.

The aforesaid detection method of the In Cell touch display panel cannot execute detection after the Cell process is accomplished. Once function abnormity of the touch sensing electrode occurs, the array substrate and the color filter substrate are scrapped together. The cost of the Cell process is wasted, too.

SUMMARY OF THE INVENTION

An objective of the present invention is to provide a detection circuit of an In Cell type touch display panel, which can detect whether the touch sensing electrode faults or not in the array process stage to prevent wasting the array substrate and the color filter substrate together as the fault happens to reduce the production cost, and also can determine the position of the faulted touch sensing electrode at the same time to be the reference for the improvement of following processes and the repair of the touch sensing electrode.

Another objective of the present invention is to provide a detection method of an In Cell type touch display panel, which can detect whether the touch sensing electrode faults or not in the array process stage to prevent wasting the array substrate and the color filter substrate together as the fault happens to reduce the production cost, and also can determine the position of the faulted touch sensing electrode at the same time to be the reference for the improvement of following processes and the repair of the touch sensing electrode.

For realizing the aforesaid objectives, the present invention first provides a detection circuit of an In Cell type touch display panel, comprising:

a plurality of touch sensing electrodes aligned in array and mutually insulated;

a line multiplexer located corresponding to the touch sensing electrodes of each column; the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;

and an electric quantity measurement unit coupled to each touch sensing electrode;

the line multiplexer activates the corresponding control switch with the control signal to make the output line where the control switch is be conducted, and the input signal charges a parasitic capacitor constructed with the touch sensing electrode and a ground via the output line and the touch conductive line;

the electric quantity measurement unit is employed to measure a charged electric quantity of each parasitic capacitor constructed with the touch sensing electrode and the ground to judge whether the corresponding touch sensing electrode faults or not according to the charged electric quantity.

Selectably, one input signal is provided corresponding to each line multiplexer.

Selectably, the plurality of line multiplexers are all electrically coupled to the same input signal, and a select switch is located between each line multiplexer and the input signal, and each select switch is correspondingly coupled to one select signal.

the control switch is a thin film transistor, and a gate thereof is coupled to the control signal, and a source is coupled to the input signal, and a drain is coupled to the touch sensing electrode via the touch conductive line.

both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch.

The present invention further provides a detection method of an In Cell type touch display panel, comprising steps of:

step 1, providing a detection circuit of the In Cell type touch display panel;

the detection circuit of the In Cell type touch display panel comprises:

a plurality of touch sensing electrodes aligned in array and mutually insulated;

a line multiplexer located corresponding to the touch sensing electrodes of each column;

the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;

and an electric quantity measurement unit coupled to each touch sensing electrode;

step 2, activating at least one control switch corresponding to the control signal with the control signal to make at least one output line where the control switch is be conducted, and the input signal charges at least one parasitic capacitor constructed with the touch sensing electrode and a ground via the output line and the touch conductive line;

step 3, measuring a charged electric quantity of the at least one parasitic capacitor constructed with the touch sensing electrode and the ground in the step 2 with the electric quantity measurement unit to judge whether the corresponding touch sensing electrode faults or not according to the charged electric quantity, and determining a position of the touch sensing electrode according to a column number where the corresponding line multiplexer is and a row number corresponded with the control signal.

Selectably, one input signal is provided corresponding to each line multiplexer;

the control switch is a thin film transistor, and a gate thereof is coupled to the control signal, and a source is coupled to the input signal, and a drain is coupled to the touch sensing electrode via the touch conductive line.

Selectably, the plurality of line multiplexers are all electrically coupled to the same input signal, and a select switch is located between each line multiplexer and the input signal, and each select switch is correspondingly coupled to one select signal;

both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch.

In the step 2, the method further comprises: activating at least one select switch with the select signal to input the input signal into at least one line multiplexer.

In the step 3, as the charged electric quantity measured with the electric quantity measurement unit is zero, a disconnected fault happens to the corresponding touch sensing electrode or the touch conductive line coupled thereto;

in the step 3, as the charged electric quantity measured with the electric quantity measurement unit is larger than a standard charged electric quantity, a short circuit fault happens to the corresponding touch sensing electrode or the touch conductive line coupled thereto.

The present invention further provides a detection method of an In Cell type touch display panel, comprising steps of:

step 1, providing a detection circuit of the In Cell type touch display panel;

the detection circuit of the In Cell type touch display panel comprises:

a plurality of touch sensing electrodes aligned in array and mutually insulated;

a line multiplexer located corresponding to the touch sensing electrodes of each column; the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;

and an electric quantity measurement unit coupled to each touch sensing electrode;

step 2, activating at least one control switch corresponding to the control signal with the control signal to make at least one output line where the control switch is be conducted, and the input signal charges at least one parasitic capacitor constructed with the touch sensing electrode and a ground via the output line and the touch conductive line;

step 3, measuring a charged electric quantity of the at least one parasitic capacitor constructed with the touch sensing electrode and the ground in the step 2 with the electric quantity measurement unit to judge whether the corresponding touch sensing electrode faults or not according to the charged electric quantity, and determining a position of the faulted touch sensing electrode according to a column number where the corresponding line multiplexer is and a row number corresponded with the control signal;

wherein the plurality of line multiplexers are all electrically coupled to the same input signal, and a select switch is located between each line multiplexer and the input signal, and each select switch is correspondingly coupled to one select signal;

both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch;

wherein in the step 2, the method further comprises: activating at least one select switch with the select signal to input the input signal into at least one line multiplexer;

wherein in the step 3, as the charged electric quantity measured with the electric quantity measurement unit is zero, a disconnected fault happens to the corresponding touch sensing electrode or the touch conductive line coupled thereto;

in the step 3, as the charged electric quantity measured with the electric quantity measurement unit is larger than a standard charged electric quantity, a short circuit fault happens to the corresponding touch sensing electrode or the touch conductive line coupled thereto.

The benefits of the present invention are: the present invention provides a detection circuit of an In Cell type touch display panel. By locating a line multiplexer corresponding to the touch sensing electrodes of each column, and selecting and charging at least one parasitic capacitor constructed with the touch sensing electrode and a ground in the touch sensing electrodes of the column with the line multiplexer, and then, measuring the charge electric quantity with the electric quantity measurement unit, and judging whether the touch sensing electrode faults or not according to the value of the charged electric quantity, the detection circuit can accomplish the fault detection to the touch sensing electrode in the array process, and the cell process does not need to finished in comparison with prior art to prevent the issue that as the touch sensing electrode faults, the array substrate and the color filter substrate are scrapped together and thus, the cost of the cell process is wasted. It can reduce the production cost and raise the product competitiveness, and also can determine the position of the faulted touch sensing electrode at the same time to be the reference for the improvement of following processes and the repair of the touch sensing electrode. The present invention further provides a detection method of an In Cell type touch display panel and a detection method. The detection method can accomplish the fault detection to the touch sensing electrode in the array process, and the cell process does not need to finished in comparison with prior art to prevent the issue that as the touch sensing electrode faults, the array substrate and the color filter substrate are scrapped together and thus, the cost of the cell process is wasted. It can reduce the production cost and raise the product competitiveness, and also can determine the position of the faulted touch sensing electrode at the same time to be the reference for the improvement of following processes and the repair of the touch sensing electrode.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 3:
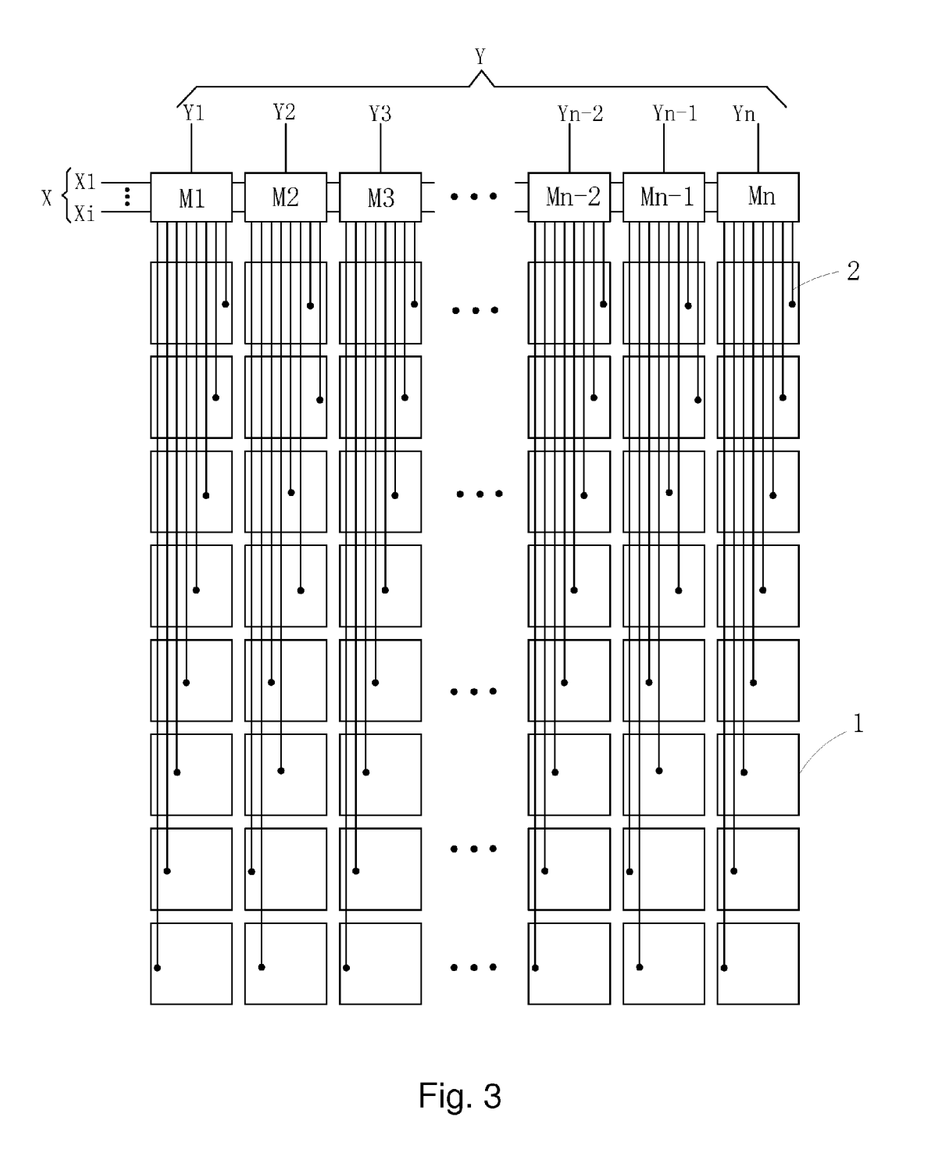
FIG. 3 is a circuit diagram of a detection circuit of an In Cell type touch display panel according to the present invention.
Figure 5:
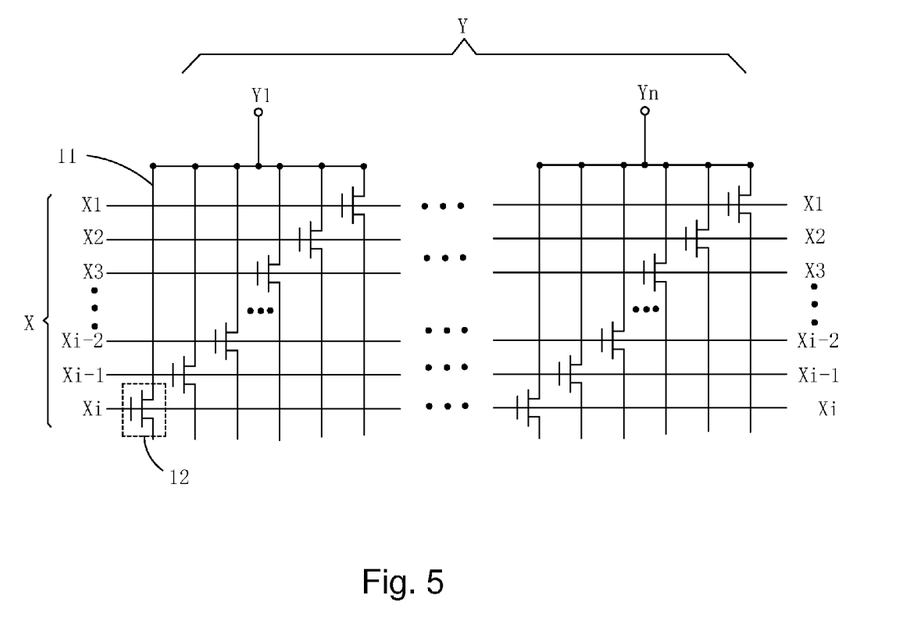
FIG. 5 is a circuit diagram of the first embodiment of a line multiplexer in a detection circuit of an In Cell type touch display panel according to the present invention.
Figure 6:
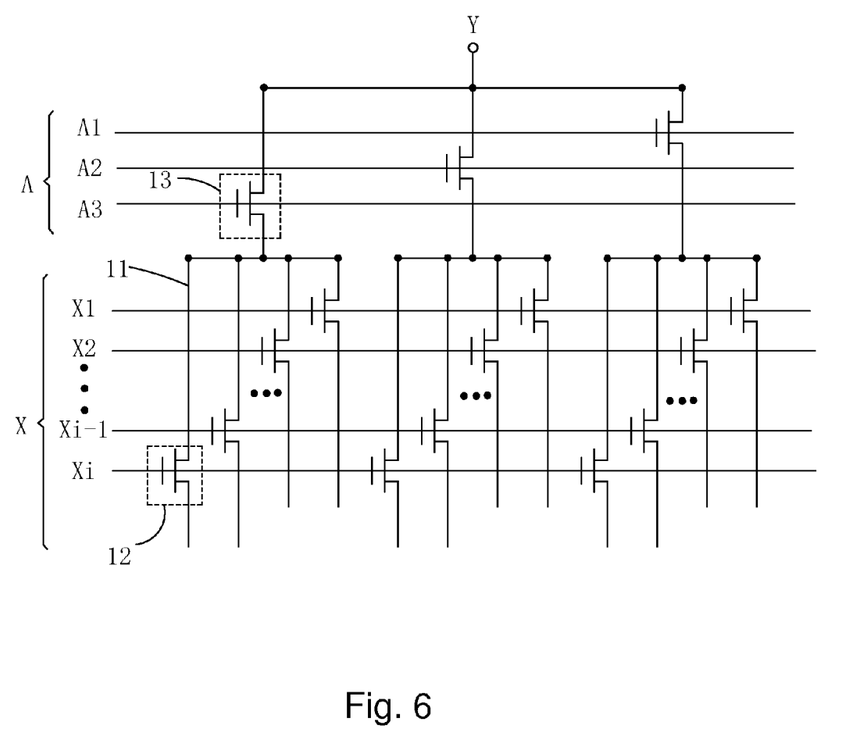
FIG. 6 is a circuit diagram of the second embodiment of a line multiplexer in a detection circuit of an In Cell type touch display panel according to the present invention.

Please refer to FIG. 3 in combination with FIG. 5 or FIG. 6. The present invention first provides a detection circuit of an In Cell type touch display panel, comprising:

a plurality of touch sensing electrodes 1 aligned in array and mutually insulated; specifically, the touch sensing electrodes 1 are the common electrodes on the array substrate, and the preferred material is ITO;

a line multiplexer located corresponding to the touch sensing electrodes 1 of each column; the line multiplexer comprises one output line 11 respectively corresponding to the touch sensing electrodes 1 of each row in said column, and each output line 11 comprises a control switch 12, and each control switch 12 is correspondingly coupled to a control signal X, and one end of the output line 11 is coupled to the corresponding touch sensing electrode 1 via a touch conductive line 2, and the other end is coupled to an input signal Y;

besides, the detection circuit of the In Cell type touch display panel further comprises: and an electric quantity measurement unit (not shown) coupled to each touch sensing electrode 1.

The line multiplexer activates the corresponding control switch 12 with the control signal X to make the output line 11 where the control switch 12 is be conducted, and the input signal Y charges a parasitic capacitor constructed with the touch sensing electrode 1 and a ground via the output line 11 and the touch conductive line 2.

Figure 4:
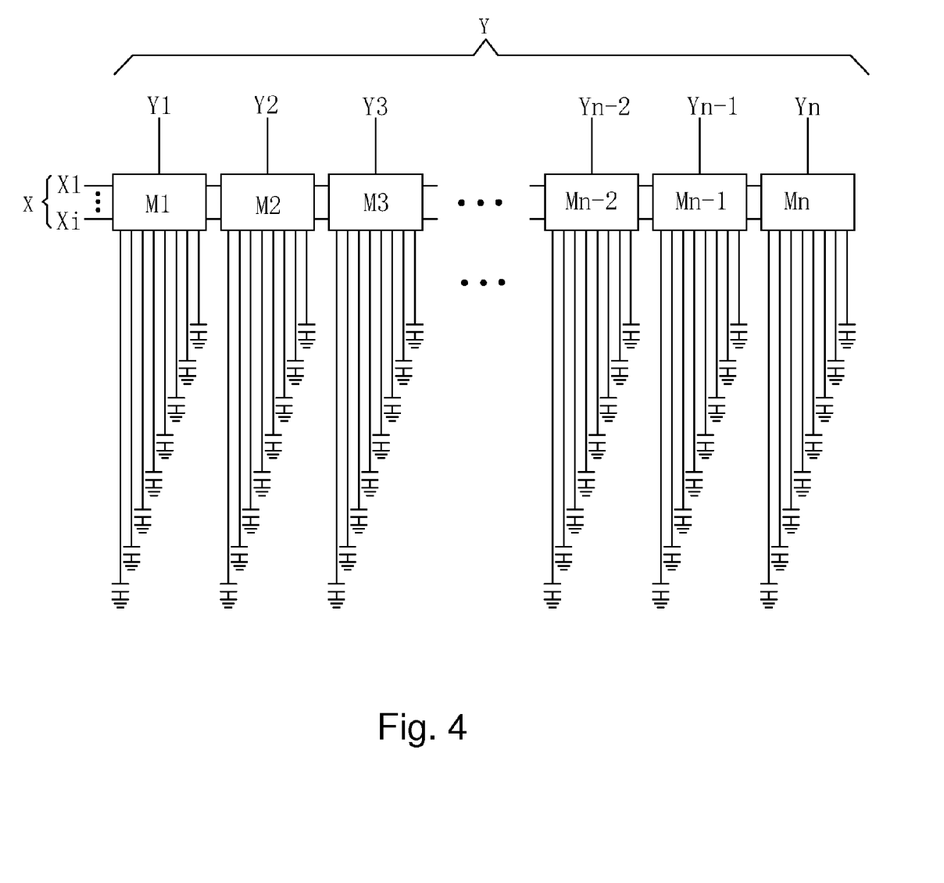
FIG. 4 is an equivalent circuit diagram of FIG. 3.

Please refer to FIG. 4, which is an equivalent circuit diagram of FIG. 3. the touch sensing electrode 1 is equivalent to one parasitic capacitor which is grounded.

The electric quantity measurement unit is employed to measure a charged electric quantity of each parasitic capacitor constructed with the touch sensing electrode 1 and the ground to judge whether the corresponding touch sensing electrode 1 faults or not according to the charged electric quantity.

FIG. 5 shows the first embodiment of a line multiplexer in a detection circuit of an In Cell type touch display panel according to the present invention. The first embodiment is a line multiplexer without structure layer division. One input signal Y is provided corresponding to each line multiplexer, and the control switch 12 is a thin film transistor, and a gate thereof is coupled to the control signal X, and a source is coupled to the input signal Y, and a drain is coupled to the touch sensing electrode 1 via the touch conductive line 2. n is set to a positive integer. 1st to nth input signals Y1-Yn are provided corresponding to 1st to nth line multiplexers M1-Mn. The structure of the first embodiment is simple. The amount of necessary control signals is less but the number of required input signals is many.

FIG. 6 shows the second embodiment of a line multiplexer in a detection circuit of an In Cell type touch display panel according to the present invention. The second embodiment is a line multiplexer with structure layer division. The plurality of line multiplexers are all electrically coupled to the same input signal Y, and a select switch 13 is located between each line multiplexer and the input signal Y, and each select switch 13 is correspondingly coupled to one select signal A. Both the control switch 12 and the select switch 13 are thin film transistors; a gate of the control switch 12 is coupled to the control signal X, and a source is coupled to a drain of the select switch 13, and a drain is coupled to the touch sensing electrode 1 via the touch conductive line 2; a gate of the select switch 13 is coupled to a select signal A, and a source is coupled to the input signal Y, and the drain is coupled to the source of the control switch 12. FIG. 4 only shows that three line multiplexers share one input signal Y, and control corresponding select switches 13 with the first, the second and the third select signals A1, A2 and A3. Certainly, more line multiplexers can share one input signal Y. In comparison with the first embodiment, the amount of necessary control signals and select signals in the second embodiment are many but the number of required input signals is less.

Furthermore, n and i are set to be positive integers, and the plurality of touch sensing electrodes 1 aligned in array and mutually insulated comprises i rows, n columns touch sensing electrodes in total. The 1st to the nth line multiplexers M1-Mn are respectively provided corresponding to the touch sensing electrodes of the 1st column to the nth column. In other words, the first line multiplexer M1 is provided corresponding to the touch sensing electrodes 1 of the first column, and the second line multiplexer M2 is provided corresponding to the touch sensing electrodes 1 of the second column, and the third line multiplexer M3 is provided corresponding to the touch sensing electrodes 1 of the third column, and so on, the n−2th, the n−1th and nth line multiplexers Mn-2, Mn-1, Mn are provided corresponding to the touch sensing electrodes 1 of the last but two, the last but one, and the last columns. Corresponding to any lin multiplexer in the 1st to the nth multiplexers M1-Mn is provided with i output lines 11. Each output line 11 comprises a control switch 12, and each control switch 12 is correspondingly coupled to a control signal X. In other words, the control switch 12 on the first output line 11 is correspondingly coupled to the first control signal X1, and the control switch 12 on the second output line 11 is correspondingly coupled to the second control signal X2, and the control switch 12 on the third output line 11 is correspondingly coupled to the third control signal X3, and so on, and the control switches 12 on the last but two, the last but one and the last output lines 11 are correspondingly coupled to the i−2th, the i−1th and the ith control signals Xi-2, Xi-1, Xi, respectively.

Figure 7:
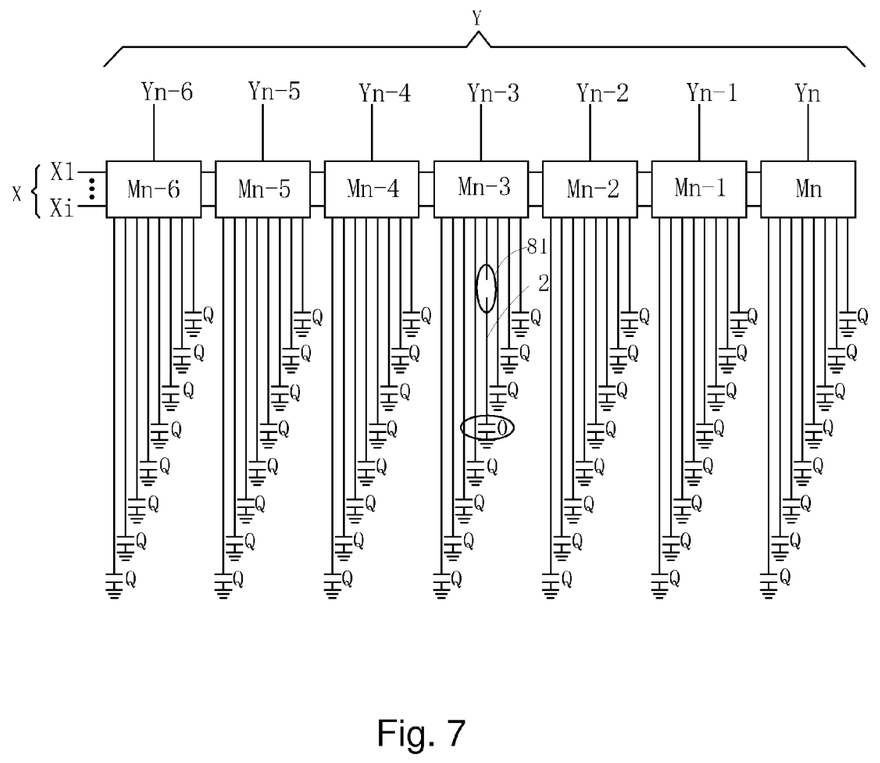
FIG. 7 is an equivalent circuit diagram when the detection circuit of the In Cell type touch display panel according to the present invention detects that some touch sensing electrode is in off state.
Figure 8:
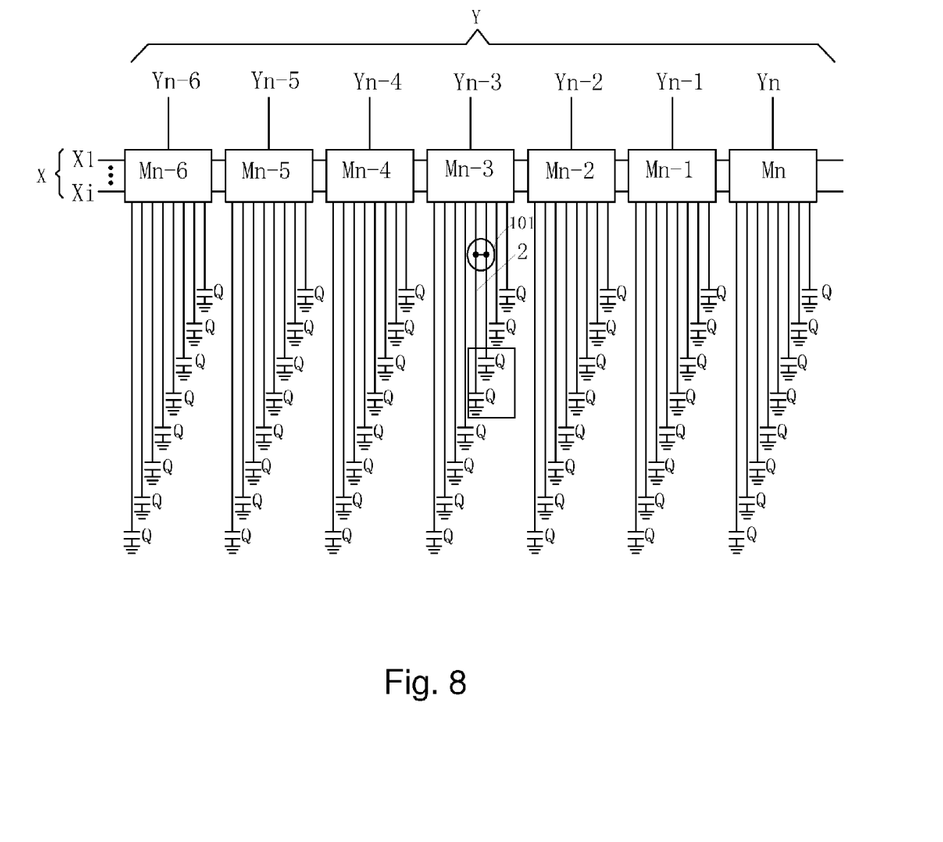
FIG. 8 is an equivalent circuit diagram when the detection circuit of the In Cell type touch display panel according to the present invention detects that some touch sensing electrode is in short circuit state.

Specifically, the charged electric quantity of each parasitic capacitor constructed with the touch sensing electrode 1 and the ground, which is measured with the electric quantity measurement unit is employed to judge whether the corresponding touch sensing electrode 1 faults or not. If the charged electric quantity is zero, a disconnected fault happens to the corresponding touch sensing electrode 1 or the touch conductive line 2 coupled thereto. For example, referring to FIG. 7, the disconnection happens to the touch conductive line 2 at the position 81 and cannot be charged. The charged electric quantity of the corresponding touch sensing electrode 1 is zero. Relatively, the charged electric quantities at the no fault positions in FIG. 7 are all standard charged electric quantity Q. If the charged electric quantity is larger than the standard charged electric quantity Q, a short circuit fault happens to the corresponding touch sensing electrode 1 or the touch conductive line 2 coupled thereto. For example, referring to FIG. 8, the short circuit happens to the touch conductive line 2 at the position 101 and then, the charged electric quantity of the touch sensing electrode 1 corresponding to the short circuit is 2Q. Relatively, the charged electric quantities at the no fault positions in FIG. 8 are all standard charged electric quantity Q.

Besides, the position of the faulted touch sensing electrode 1 can be determined with combination of a column number where the line multiplexer is and a row number corresponded with the control signal X. In case that the line multiplexer is the line multiplexer shown in the first embodiment in FIG. 5, the line multiplexer corresponded with the position 81 (or position 101) is the n−3th line multiplexer, and the corresponding input signal is the n−3th input signal Yn-3. With combination of the corresponding control signal X4 in the output line 11, the position of the faulted touch sensing electrode 1 can be judged to be the touch sensing electrode of the n−3th column, the 4th row according to Yn-3 and X4. In case that the line multiplexer is the line multiplexer shown in the second embodiment in FIG. 6, the line multiplexer corresponded with the position 81 (or position 101) is the n−3th line multiplexer, and the corresponding input signal is the n−3th input signal Yn-3. With combination of the corresponding control signal X4 in the output line 11, the position of the faulted touch sensing electrode 1 can be judged to be the touch sensing electrode of the n−3th column, the 4th row.

The present invention further provides a detection method of an In Cell type touch display panel, comprising steps of:

step 1, providing a detection circuit of the In Cell type touch display panel;

referring to FIG. 3, FIG. 4 in combination with FIG. 5 or FIG. 6, the detection circuit of the In Cell type touch display panel comprises:

a plurality of touch sensing electrodes 1 aligned in array and mutually insulated;

a line multiplexer located corresponding to the touch sensing electrodes 1 of each column; the line multiplexer comprises one output line 11 respectively corresponding to the touch sensing electrodes 1 of each row in said column, and each output line 11 comprises a control switch 12, and each control switch 12 is correspondingly coupled to a control signal X, and one end of the output line 11 is coupled to the corresponding touch sensing electrode 1 via a touch conductive line 2, and the other end is coupled to an input signal Y;

and an electric quantity measurement unit coupled to each touch sensing electrode 1.

Selectably, the line multiplexer shown in FIG. 5 is a line multiplexer without layer structure division. One input signal Y is provided corresponding to each line multiplexer; the control switch 12 is a thin film transistor, and a gate thereof is coupled to the control signal X, and a source is coupled to the input signal Y, and a drain is coupled to the touch sensing electrode 1 via the touch conductive line 2.

Or, the line multiplexer shown in FIG. 6 is a line multiplexer with layer structure division. The plurality of line multiplexers are all electrically coupled to the same input signal Y, and a select switch 13 is located between each line multiplexer and the input signal Y, and each select switch 13 is correspondingly coupled to one select signal A; both the control switch 12 and the select switch 13 are thin film transistors; a gate of the control switch 12 is coupled to the control signal X, and a source is coupled to a drain of the select switch 13, and a drain is coupled to the touch sensing electrode 1 via the touch conductive line 2; a gate of the select switch 13 is coupled to a select signal A, and a source is coupled to the input signal Y, and the drain is coupled to the source of the control switch 12.

step 2, activating at least one control switch 12 corresponding to the control signal with the control signal X to make at least one output line 11 where the control switch 12 is be conducted, and the input signal Y charges at least one parasitic capacitor constructed with the touch sensing electrode 1 and a ground via the output line 11 and the touch conductive line 2.

When the line multiplexer shown in FIG. 6 is a line multiplexer with layer structure division, the step 2 further comprises: activating at least one select switch 13 with the select signal A to input the input signal Y into at least one line multiplexer.

step 3, measuring a charged electric quantity of the at least one parasitic capacitor constructed with the touch sensing electrode 1 and the ground in the step 2 with the electric quantity measurement unit to judge whether the corresponding touch sensing electrode 1 faults or not according to the charged electric quantity, and determining a position of the faulted touch sensing electrode 1 according to a column number where the corresponding line multiplexer is and a row number corresponded with the control signal X.

Specifically, n and i are set to be positive integers, and the plurality of touch sensing electrodes 1 aligned in array and mutually insulated comprises i rows, n columns touch sensing electrodes in total. the 1st to the nth line multiplexers M1-Mn are respectively provided corresponding to the touch sensing electrodes of the 1st column to the nth column. In other words, the first line multiplexer M1 is provided corresponding to the touch sensing electrodes 1 of the first column, and the second line multiplexer M2 is provided corresponding to the touch sensing electrodes 1 of the second column, and the third line multiplexer M3 is provided corresponding to the touch sensing electrodes 1 of the third column, and so on, the n−2th, the n−1th and nth line multiplexers Mn-2, Mn-1, Mn are provided corresponding to the touch sensing electrodes 1 of the last but two, the last but one, and the last columns. Corresponding to any lin multiplexer in the 1st to the nth multiplexers M1-Mn is provided with i output lines 11. Each output line 11 comprises a control switch 12, and each control switch 12 is correspondingly coupled to a control signal X. In other words, the control switch 12 on the first output line 11 is correspondingly coupled to the first control signal X1, and the control switch 12 on the second output line 11 is correspondingly coupled to the second control signal X2, and the control switch 12 on the third output line 11 is correspondingly coupled to the third control signal X3, and so on, and the control switches 12 on the last but two, the last but one and the last output lines 11 are correspondingly coupled to the i−2th, the i−1th and the ith control signals Xi-2, Xi-1, Xi, respectively.

The charged electric quantity of each parasitic capacitor constructed with the touch sensing electrode 1 and the ground, which is measured with the electric quantity measurement unit is employed to judge whether the corresponding touch sensing electrode 1 faults or not. If the charged electric quantity is zero, a disconnected fault happens to the corresponding touch sensing electrode 1 or the touch conductive line 2 coupled thereto. For example, referring to FIG. 7, the disconnection happens to the touch conductive line 2 at the position 81 and cannot be charged. The charged electric quantity of the corresponding touch sensing electrode 1 is zero. Relatively, the charged electric quantities at the no fault positions in FIG. 7 are all standard charged electric quantity Q. If the charged electric quantity is larger than the standard charged electric quantity Q, a short circuit fault happens to the corresponding touch sensing electrode 1 or the touch conductive line 2 coupled thereto. For example, referring to FIG. 8, the short circuit happens to the touch conductive line 2 at the position 101 and then, the charged electric quantity of the touch sensing electrode 1 corresponding to the short circuit is 2Q. Relatively, the charged electric quantities at the no fault positions in FIG. 8 are all standard charged electric quantity Q.

Besides, the position of the faulted touch sensing electrode 1 can be determined with combination of a column number where the line multiplexer is and a row number corresponded with the control signal X. In case that the line multiplexer is the line multiplexer shown in the first embodiment in FIG. 5, the line multiplexer corresponded with the position 81 (or position 101) is the n−3th line multiplexer, and the corresponding input signal is the n−3th input signal Yn-3. With combination of the corresponding control signal X4 in the output line 11, the position of the faulted touch sensing electrode 1 can be judged to be the touch sensing electrode of the n−3th column, the 4th row according to Yn-3 and X4. In case that the line multiplexer is the line multiplexer shown in the second embodiment in FIG. 6, the line multiplexer corresponded with the position 81 (or position 101) is the n−3th line multiplexer, and the corresponding input signal is the n−3th input signal Yn-3. With combination of the corresponding control signal X4 in the output line 11, the position of the faulted touch sensing electrode 1 can be judged to be the touch sensing electrode of the n−3th column, the 4th row.

In conclusion, the present invention provides a detection circuit of an In Cell type touch display panel. By locating a line multiplexer corresponding to the touch sensing electrodes of each column, and selecting and charging at least one parasitic capacitor constructed with the touch sensing electrode and a ground in the touch sensing electrodes of the column with the line multiplexer, and then, measuring the charge electric quantity with the electric quantity measurement unit, and judging whether the touch sensing electrode faults or not according to the value of the charged electric quantity, the detection circuit can accomplish the fault detection to the touch sensing electrode in the array process, and the cell process does not need to finished in comparison with prior art to prevent the issue that as the touch sensing electrode faults, the array substrate and the color filter substrate are scrapped together and thus, the cost of the cell process is wasted. It can reduce the production cost and raise the product competitiveness, and also can determine the position of the faulted touch sensing electrode at the same time to be the reference for the improvement of following processes and the repair of the touch sensing electrode. The present invention further provides a detection circuit of an In Cell type touch display panel and a detection method. The detection method can accomplish the fault detection to the touch sensing electrode in the array process, and the cell process does not need to finished in comparison with prior art to prevent the issue that as the touch sensing electrode faults, the array substrate and the color filter substrate are scrapped together and thus, the cost of the cell process is wasted. It can reduce the production cost and raise the product competitiveness, and also can determine the position of the faulted touch sensing electrode at the same time to be the reference for the improvement of following processes and the repair of the touch sensing electrode.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A fault detection circuit of an In Cell type touch display panel before a cell process of the In Cell type touch display panel, comprising:
   a plurality of touch sensing electrodes aligned in array and mutually insulated on an array substrate of the In Cell type touch display panel before the cell process;
   a line multiplexer located corresponding to the touch sensing electrodes of each column; the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;
   and an electric quantity measurement unit coupled to each touch sensing electrode;
   the line multiplexer activates the corresponding control switch with the control signal to make the output line where the control switch is conducted, and the input signal charges a parasitic capacitor constructed with the touch sensing electrode and a ground via the output line and the touch conductive line;
   the electric quantity measurement unit is employed to measure a charged electric quantity of each parasitic capacitor constructed with the touch sensing electrode and the ground to judge whether the corresponding touch sensing electrode faults or not according to the charged electric quantity;
   wherein as the charged electric quantity measured with the electric quantity measurement unit is zero, a disconnected fault happens to the corresponding touch sensing electrode or the touch conductive line coupled thereto;
   as the charged electric quantity measured with the electric quantity measurement unit is larger than a standard charged electric quantity, a short circuit fault happens to the corresponding touch sensing electrode or the touch conductive line coupled thereto.

2. The fault detection circuit of the In Cell type touch display panel before the cell process of the In Cell type touch display panel according to claim 1, wherein one input signal is provided corresponding to each line multiplexer.

3. The fault detection circuit of the In Cell type touch display panel before the cell process of the In Cell type touch display panel according to claim 2, wherein the control switch is a thin film transistor, and a gate thereof is coupled to the control signal, and a source is coupled to the input signal, and a drain is coupled to the touch sensing electrode via the touch conductive line.

4. The fault detection circuit of the In Cell type touch display panel according to claim 1, wherein the plurality of line multiplexers are all electrically coupled to the same input signal, and a select switch is located between each line multiplexer and the input signal, and each select switch is correspondingly coupled to one select signal.

5. The fault detection circuit of the In Cell type touch display panel before the cell process of the In Cell type touch display panel according to claim 4, wherein both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch.

6. A fault detection method of an In Cell type touch display panel before a cell process of the In Cell type touch display panel, comprising steps of:
   step 1, providing a fault detection circuit of the In Cell type touch display panel before the cell process of the In Cell type touch display panel;
   the fault detection circuit of the In Cell type touch display panel comprises:
   a plurality of touch sensing electrodes aligned in array and mutually insulated on an array substrate of the In Cell type touch display panel before the cell process;
   a line multiplexer located corresponding to the touch sensing electrodes of each column; the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;

and an electric quantity measurement unit coupled to each touch sensing electrode;

step 2, activating at least one control switch corresponding to the control signal with the control signal to make at least one output line where the control switch is be conducted, and the input signal charges at least one parasitic capacitor constructed with the touch sensing electrode and a ground via the output line and the touch conductive line;

step 3, measuring a charged electric quantity of the at least one parasitic capacitor constructed with the touch sensing electrode and the ground in the step 2 with the electric quantity measurement unit to judge whether the corresponding touch sensing electrode faults or not according to the charged electric quantity, and determining a position of the faulted touch sensing electrode according to a column number where the corresponding line multiplexer is and a row number corresponded with the control signal;

wherein in step 3, as the charged electric quantity measured with the electric quantity measurement unit is zero, a disconnected fault happens to the corresponding touch sensing electrode or the touch conductive line coupled thereto;

in step 3, as the charged electric quantity measured with the electric quantity measurement unit is larger than a standard charged electric quantity, a short circuit fault happens to the corresponding touch sensing electrode or the touch conductive line coupled thereto.

7. The fault detection method of an In Cell type touch display panel before the cell process of the In Cell type touch display panel according to claim 6, wherein
one input signal is provided corresponding to each line multiplexer;
the control switch is a thin film transistor, and a gate thereof is coupled to the control signal, and a source is coupled to the input signal, and a drain is coupled to the touch sensing electrode via the touch conductive line.

8. The fault detection method of the In Cell type touch display panel before the cell process of the In Cell type touch display panel according to claim 6, wherein the plurality of line multiplexers are all electrically coupled to the same input signal, and a select switch is located between each line multiplexer and the input signal, and each select switch is correspondingly coupled to one select signal;
both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch.

9. The fault detection method of an In Cell type touch display panel before the cell process of the In Cell type touch display panel according to claim 8, wherein in step 2, the method further comprises: activating at least one select switch with the select signal to input the input signal into at least one line multiplexer.

10. A fault detection method of an In Cell type touch display panel before a cell process of the In Cell type touch display panel, comprising steps of:

step 1, providing a fault detection circuit of the In Cell type touch display panel before the cell process of the In Cell type touch display panel;
the fault detection circuit of the In Cell type touch display panel comprises:
a plurality of touch sensing electrodes aligned in array and mutually insulated on an array substrate of the In Cell type touch display panel before the cell process;
a line multiplexer located corresponding to the touch sensing electrodes of each column; the line multiplexer comprises one output line respectively corresponding to the touch sensing electrodes of each row in said column, and each output line comprises a control switch, and each control switch is correspondingly coupled to a control signal, and one end of the output line is coupled to the corresponding touch sensing electrode via a touch conductive line, and the other end is coupled to an input signal;
and an electric quantity measurement unit coupled to each touch sensing electrode;
step 2, activating at least one control switch corresponding to the control signal with the control signal to make at least one output line where the control switch is conducted, and the input signal charges at least one parasitic capacitor constructed with the touch sensing electrode and a ground via the output line and the touch conductive line;
step 3, measuring a charged electric quantity of the at least one parasitic capacitor constructed with the touch sensing electrode and the ground in step 2 with the electric quantity measurement unit to judge whether the corresponding touch sensing electrode faults or not according to the charged electric quantity, and determining a position of the faulted touch sensing electrode according to a column number where the corresponding line multiplexer is and a row number corresponded with the control signal;
wherein the plurality of line multiplexers are all electrically coupled to the same input signal, and a select switch is located between each line multiplexer and the input signal, and each select switch is correspondingly coupled to one select signal;
both the control switch and the select switch are thin film transistors; a gate of the control switch is coupled to the control signal, and a source is coupled to a drain of the select switch, and a drain is coupled to the touch sensing electrode via the touch conductive line; a gate of the select switch is coupled to a select signal, and a source is coupled to the input signal, and the drain is coupled to the source of the control switch;
wherein in step 2, the method further comprises: activating at least one select switch with the select signal to input the input signal into at least one line multiplexer;
wherein in step 3, as the charged electric quantity measured with the electric quantity measurement unit is zero, a disconnected fault happens to the corresponding touch sensing electrode or the touch conductive line coupled thereto;
in step 3, as the charged electric quantity measured with the electric quantity measurement unit is larger than a standard charged electric quantity, a short circuit fault happens to the corresponding touch sensing electrode or the touch conductive line coupled thereto.

* * * * *